US010085597B2

(12) United States Patent
Bodum

(10) Patent No.: US 10,085,597 B2
(45) Date of Patent: Oct. 2, 2018

(54) DOUBLE-WALLED VESSEL HAVING PRESSURE EQUALIZATION OPENING

(75) Inventor: Jorgen Bodum, Meggen (CH)

(73) Assignee: PI-DESIGN AG, Triengen (CH)

( * ) Notice: Subject to any disclaimer, the term of this patent is extended or adjusted under 35 U.S.C. 154(b) by 1527 days.

(21) Appl. No.: 12/812,397

(22) PCT Filed: Jan. 14, 2008

(86) PCT No.: PCT/CH2008/000017
§ 371 (c)(1),
(2), (4) Date: Jul. 9, 2010

(87) PCT Pub. No.: WO2009/089636
PCT Pub. Date: Jul. 23, 2009

(65) Prior Publication Data
US 2010/0288776 A1    Nov. 18, 2010

(51) Int. Cl.
| A47J 41/00 | (2006.01) |
| B65D 90/32 | (2006.01) |
| B23P 11/00 | (2006.01) |
| A47J 41/02 | (2006.01) |
| F16K 24/04 | (2006.01) |

(52) U.S. Cl.
CPC .......... *A47J 41/02* (2013.01); *A47J 41/0077* (2013.01); *F16K 24/04* (2013.01); *Y10T 29/49826* (2015.01)

(58) Field of Classification Search
CPC .......... A47J 41/00; A47J 41/02; B65D 90/32; B65D 51/16; B65D 51/1633; B65D 51/1644; F16K 5/103; F16K 24/00

USPC .......... 220/592.17, 592.16, 592.2, 592.26, 220/592.27, 745–750, 913, 495.04; 215/12.1; 137/493.1, 846, 847, 854, 493, 137/197
See application file for complete search history.

(56) References Cited

U.S. PATENT DOCUMENTS

| 2,981,430 A | * | 4/1961 | Chin et al. .................... 215/12.1 |
| 3,326,230 A | * | 6/1967 | Frank .............................. 137/199 |
| 3,882,882 A | * | 5/1975 | Preisig ............................ 137/98 |
| 4,434,810 A | * | 3/1984 | Atkinson ....................... 137/493 |
| 4,545,492 A | * | 10/1985 | Firestone ...................... 215/227 |
| 5,411,055 A | * | 5/1995 | Kane .......................... 137/513.5 |

(Continued)

FOREIGN PATENT DOCUMENTS

| DE | 90 05 464 U1 | 7/1990 |
| EP | 0 717 949 A1 | 6/1996 |

(Continued)

OTHER PUBLICATIONS

Japanese Office Action corresponding to Japanese Patent Application No. 2010-541667, dated Jul. 3, 2012.

*Primary Examiner* — Andrew Perreault
(74) *Attorney, Agent, or Firm* — Sughrue Mion, PLLC

(57) ABSTRACT

A double-walled vessel (1) is disclosed, which has a pressure equalization opening (24). Said opening is closed by a stopper (4), which has at least one gas passage channel (41). Said channel is configured such that it allows air to pass, while it prevents the penetration of water into the intermediate space. The stopper is preferably made from a silicone-based plastic and fastened to the vessel by means of an adhesive based on acetoxy silicone. For fastening purposes, it may comprise a disk-like fastening flange (43).

14 Claims, 2 Drawing Sheets

(56) References Cited

U.S. PATENT DOCUMENTS

| | | | | |
|---|---|---|---|---|
| 5,678,725 | A * | 10/1997 | Yamada et al. | 220/592.21 |
| 5,769,262 | A * | 6/1998 | Yamada et al. | 220/592.17 |
| 5,996,625 | A * | 12/1999 | Collado et al. | 137/614.19 |
| 6,789,393 | B2 * | 9/2004 | Dais et al. | 62/457.6 |
| 7,243,676 | B2 * | 7/2007 | Bailey | 137/512.15 |
| 8,272,398 | B2 * | 9/2012 | Erdmann | 137/533 |
| 2001/0048035 | A1 * | 12/2001 | Dantes et al. | 239/5 |
| 2006/0000733 | A1 * | 1/2006 | Albritton et al. | 206/432 |
| 2008/0190512 | A1 * | 8/2008 | Borchardt | 141/8 |

FOREIGN PATENT DOCUMENTS

| | | |
|---|---|---|
| JP | 3110272 U | 11/1991 |
| JP | 2001315825 A | 11/2001 |
| JP | 2005289417 A | 10/2005 |
| WO | 2006/005002 A2 | 1/2006 |

* cited by examiner

DOUBLE-WALLED VESSEL HAVING PRESSURE EQUALIZATION OPENING

TECHNICAL FIELD

The present invention relates to a double-walled vessel having an outer vessel body and an inner vessel body arranged therein, so that a gas-filled, heat-insulating interspace is present between the vessel bodies. A double-walled vessel of this kind can be made, in particular, from glass.

PRIOR ART

EP-A-0 717 949 discloses a double-walled vessel, the outer vessel body of which has a through-hole. The latter serves, following connection of the inner and the outer vessel body, to introduce a gas with low thermal conductivity into the interspace between the vessel bodies. After this gas exchange, the opening is sealed by a drop of glue and optionally, in addition, by a sealing plate.

When a vessel of this type is exposed to strong temperature fluctuations, the pressure of the gas present in the interspace between the vessel bodies changes. These pressure changes lead, on the one hand, to stresses in the material of the vessel, which in the extreme case can cause the vessel to burst. On the other hand, constant pressure fluctuations can result in leaking of the glue plug upon extended use and hence in possible penetration of liquid into the interspace. The vessel thereby becomes practically unusable.

SUMMARY OF THE INVENTION

An object of the present invention is therefore to make available a double-walled vessel which in a simple manner prevents excessive pressure fluctuations in the interspace between the vessel bodies. This object is achieved by a double-walled vessel having the features of claim 1.

A further object of the present invention is to make available a method for producing a double-walled vessel of this type. This object is achieved by a method having the features of claim 9.

Advantageous embodiments are given in the dependent claims.

A double-walled vessel is thus provided, which has an outer vessel body and an inner vessel body. The inner vessel body is arranged in the outer vessel body in such a way that a gas-filled interspace is formed between the inner and the outer vessel body. In a wall of at least one of the vessel bodies, preferably in that wall of the outer vessel body which forms the base, a pressure compensation opening is present, which in particular serves to permit a gas exchange, for pressure compensation between the interspace and the exterior, when the two vessel bodies are joined together. This pressure compensation opening is sealed by a plug to prevent moisture from penetrating into the interspace. In order nevertheless to continue to allow a pressure compensation between the interspace and the exterior, the plug has at least one gas passage channel extending through it, which gas passage channel, in case of pressure differences, allows a passage of gas, in particular of air, while preventing a passage of liquids, in particular of water.

Such a vessel is preferably produced by providing, first of all, the outer and the inner vessel body, at least one of these vessel bodies having a limit wall containing a pressure compensation opening. The inner vessel body is next arranged in the outer vessel body and connected thereto. This is preferably done by the inner and the outer vessel body, in at least one region, preferably in an upper marginal region, of the two vessel bodies, being fused or welded together. A gas-filled interspace is hereby formed between the two vessel bodies. While the vessel bodies are being mutually connected, the pressure compensation opening allows a gas exchange between the interspace and the exterior, so that no overpressure or underpressure can arise in the interspace. After the vessel bodies have been mutually connected, the interspace can optionally be flushed with a gas, for example air or an inert gas such as nitrogen, through the pressure compensation opening. After this, the pressure compensation opening is sealed by the plug.

The present invention offers particular advantages if the inner and the outer vessel body are made from glass. In this case, the pressure compensation opening is particularly important to prevent stresses during the production and, in particular, during the fusion of the two vessel bodies. In principle, it is also conceivable, however, for the two vessel bodies to consist of another material, for example of stainless steel or plastic.

The plug can consist, for example, of an elastic plastics material and can be produced in an injection molding process, a compression molding process or a transfer molding process, i.e. in a process in which a plastic or a precursor of this plastic is poured into a mold and then hardened. In particular, it is advantageous to form the gas passage channel only once the plug material has at least partially hardened, for example by piercing of the plug with a needle.

In order to ensure that no water can make its way through the gas passage channel, the plug is preferably made of a hydrophobic material (i.e. of a material which forms with water a contact angle of more than 90°). The dimensions of the gas passage channel are in this case chosen such that the capillary effect in the channel effectively prevents the passage of water. The diameter of the gas passage channel is, for example, at most about 0.1 mm, combined with a length of at least about 1 mm, for silicone plastic or a material having similar hydrophobic properties. Of course, other dimensions are also possible.

The pressure compensation channel can in particular be conFigured such that it is self-sealing, i.e. opens only due to a pressure difference between the interspace and the exterior and, without any such pressure difference, is sealed. This property can be achieved, in particular, by virtue of the above-described production of the channel by means of piercing. Following the withdrawal of the needle, such a channel automatically reseals, given appropriate elasticity of the plug material. As soon as a certain pressure difference arises between the interspace of the vessel bodies and the exterior, the gas passage channel widens, due to this pressure difference, sufficiently to allow a passage of gas. The channel nevertheless remains at all times sufficiently small in its diameter that, due to the hydrophobic properties of the material and the resultant negative capillarity, no passage of water is possible.

As material for the plug, a silicone-based plastic or a material with comparable properties is particularly preferably selected. Due to its high elasticity and its hydrophobic properties, in a silicone plastic plug a gas passage channel which allows a passage of gas, while preventing a passage of water, can be particularly well formed. The use of a silicone plastic plug is particularly advantageous when the vessel bodies are made from glass, since glass and silicone plastic, due to their similar chemical composition, can be permanently connected to each other very well.

The plug is preferably glued to that vessel body in which the pressure compensation opening is present and, in particular, is fastened to this vessel body with an acetoxy-silicone-based adhesive. Due to its composition, which is chemically related to silicone rubber, such an adhesive is particularly suitable for establishing a permanent connection to a silicone plug. In particular, such an adhesive is also eminently suitable for a connection to a glass vessel body, glass likewise having a similar chemical composition.

The plug can be conFigured, in particular, in the form of a flat plate having a pin-like (or peg-like) main portion extending from this plate into the pressure compensation opening. In other words, the plug in this case comprises a main portion, through which the gas passage channel extends, and a fastening flange, which laterally surrounds the main portion and which, at least in some areas, rests flat on the wall of the vessel body and is preferably glued to this wall. The pin-like main portion is preferably of cylindrical form and preferably has a maximum outer diameter which is smaller than the minimum inner diameter of the pressure compensation opening, so that a lateral gap is present between the main portion and that wall region of the vessel body which delimits the pressure compensation opening. This offers advantages, in particular, when the pressure compensation opening has considerable tolerances in its dimensions, as is the case, in particular, with glass vessels. The pin-like main portion can then be inserted without force into the pressure compensation opening, regardless of the precise dimensions of the latter. The connection of the plug to the vessel wall is then realized solely via the fastening flange.

In an alternative embodiment, the plug is disk-shaped or cylindrical and has on its circumferential shell surface a circumferential annular groove, into which that wall region of the vessel body which delimits the pressure compensation opening projects. The plug is thus in this case held in the pressure compensation opening at least partially by form closure, with the aid of the annular groove. In addition, in this embodiment, the plug is also preferably glued to the vessel wall. Such an embodiment of the plug is suitable, in particular, for pressure compensation in shape and dimensions.

BRIEF DESCRIPTION OF THE DRAWINGS

Preferred embodiments of the invention are described below with reference to the drawings, in which.

DETAILED DESCRIPTION OF PREFERRED EMBODIMENTS

Figure 1:
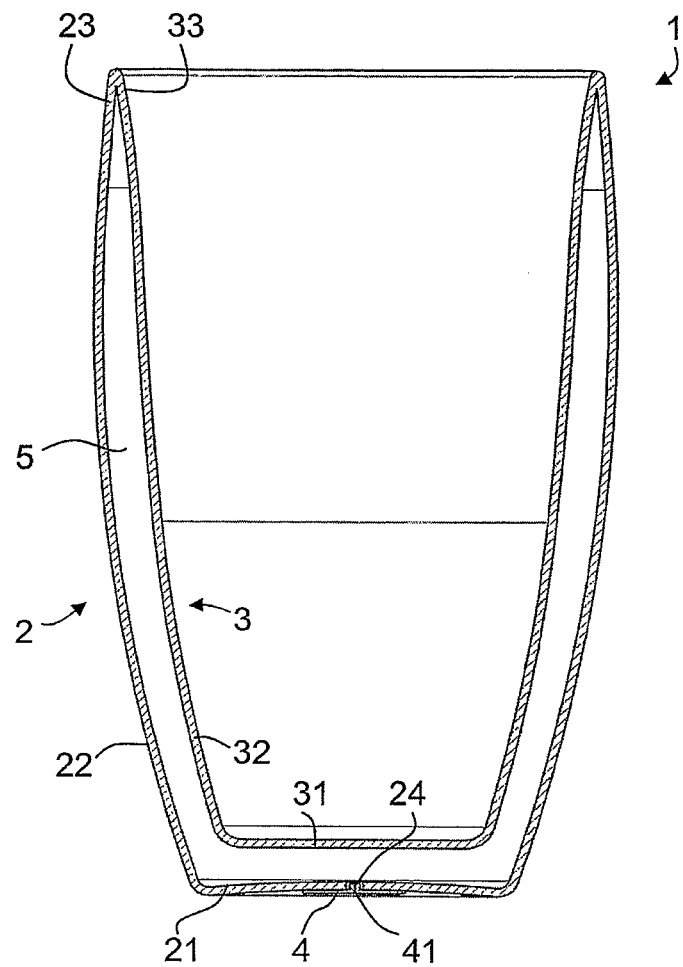
FIG. 1 shows a central longitudinal section through a double-walled vessel.
Figure 2:
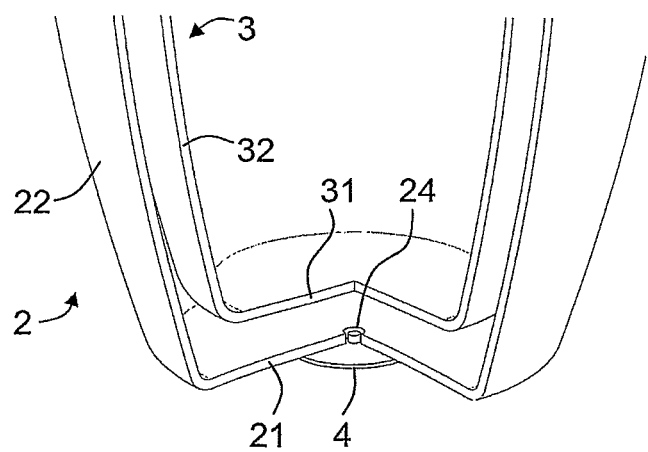
FIG. 2 shows a perspective part-view of the vessel of FIG. 1 in partial section.
Figure 3:
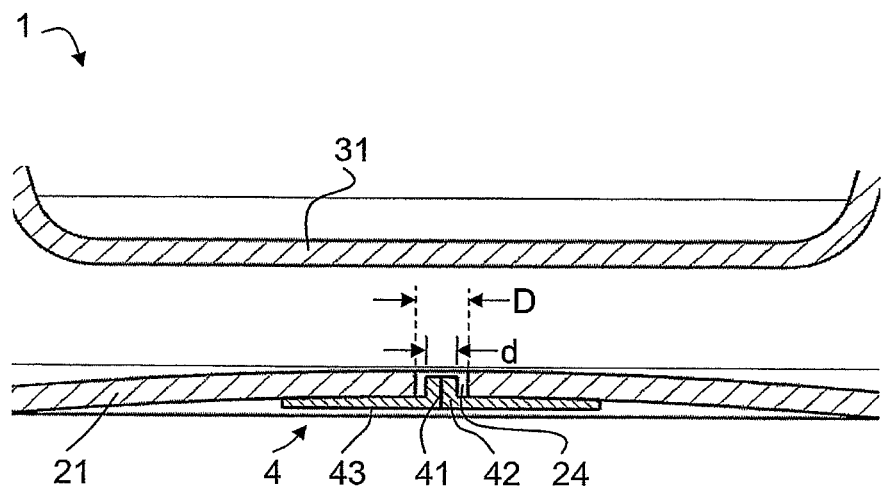
FIG. 3 shows an enlarged detailed view of the base region of FIG. 1.

In FIGS. 1 to 3, a first illustrative embodiment of a double-walled vessel according to the present invention is indicated. The vessel 1 is formed from an outer vessel body 2 of silicate glass and an inner vessel body 3, accommodated therein, of the same material. The two vessel bodies are fused together at their respective upper ends 23, 33. The two vessel bodies hence jointly delimit a gas-filled interspace 5. The vessel bodies thus form, with the outer base 21, the outer side wall 22, the inner base 31 and the inner side wall 32, limit walls for the interspace. In one of these limit walls, here in the outer base 21, a pressure compensation opening 24 is present. In the present example, this has a diameter of about 1.5 to 3.5 mm. Since the vessel bodies consist of glass, the shape and dimensions of this pressure compensation opening can be subject to considerable variations, even within a production series. The pressure compensation opening is in any event, however, sufficiently large to allow a rapid pressure compensation between the interspace and the exterior in the fusion of the vessel bodies.

Following the connection of the vessel bodies, this pressure compensation opening is sealed with a plug 4. This has the shape of a flat, circular disk, which has a central pin-like main portion 42 extending into the pressure compensation opening. In the present example, the outer diameter d of the main portion is about 1.5 mm. It is in this case smaller throughout than the inner diameter D of the pressure compensation opening, even when the production tolerances are taken into account. From this pin-like main portion, a disk-like fastening flange 43 extends laterally outward and rests flat on the outer side of the base 21. This fastening flange 43 is glued to the base 21 by means of an adhesive.

The main portion 42 has a central gas passage channel 41. This channel has been formed by piercing of the main portion with a needle having a diameter of, for example, about 0.6 mm. Other dimensions of the needle are, of course, possible. Once the needle has been withdrawn, the gas passage channel is essentially resealed due to the elastic properties of the plug material. In the event of pressure differences between the interspace and the exterior, the elasticity of the material, however, enables the channel to widen sufficiently to allow gas to pass through.

The plug preferably consists of a silicone-based plastic, in the present example of silicone having a hardness of Shore A 70. The plug has been produced by means of injection molding. Due to its hydrophobic properties and the resultant negative capillary effect, the plug, despite the presence of the gas passage channel, prevents water from penetrating into the interspace 5. This is the case even under the aggressive chemical conditions in a dishwasher and when dishes are washed by hand with or without detergent. If hot water is put into the vessel, then the expanding air in the interspace 5 can escape through the gas passage channel 41 and, upon cooling, can force its way back in correspondingly.

In order to fasten the plug to the base 21, a silicone-based glue is used, in the present example in particular an acetoxy-silicone-based glue, as is available, for example, from the company Henkel Loctite Europe under the name Loctite™ 5366. This glue, on the one hand, exhibits very good adhesion on the silicone material of the plug and, on the other hand, allows very good connection to the glass material of the outer vessel body.

Figure 4:
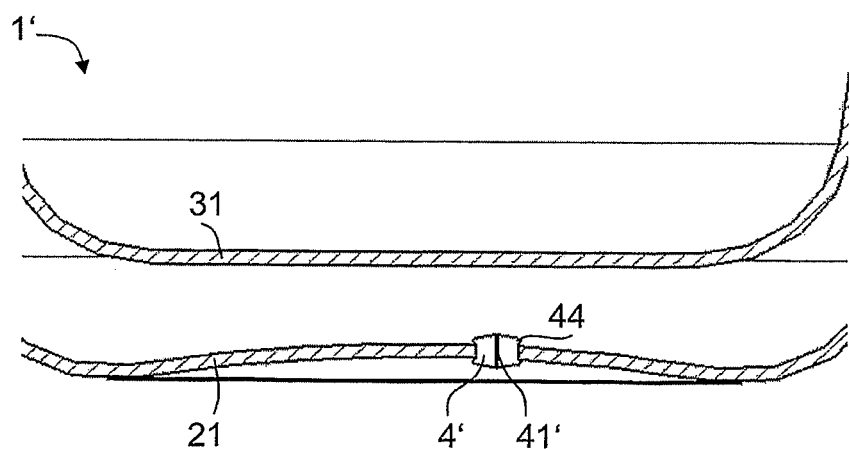
FIG. 4 shows an enlarged detailed view of the base region of a double-walled vessel according to an alternative embodiment.

An alternative embodiment is represented in FIG. 4. In contrast to the first embodiment, the pressure compensation opening is here not arranged centrally in the base 21, but is offset to the center axis of the vessel. The plug 4' has a substantially cylindrical-disk-shaped basic form. On the cylindrical shell surface there is formed a circumferential annular groove 44, into which a region of the base 21, which delimits the pressure compensation opening, projects. The plug 4' is thus held in the region of the pressure compensation opening in the base 21, with the aid of this groove, at least partially by form closure. In addition, the plug 4' is also glued to the base 21 in the region of the annular groove. The gas passage channel 41' is formed in the same way as in the first embodiment, by piercing of the at least partially hardened plug 4' by a needle. In comparison to the first embodiment, the second embodiment demands far smaller tolerances for the shape and dimensions of the pressure compensation opening, since the plug is fastened directly in the region of this opening.

Of course, a large number of modifications are possible, and the invention is in no way limited to the above-discussed illustrative embodiments. For instance, the double-walled vessel can have a different shape than the shape, represented here, of a tall drinking glass, for example as a cup with handle or as a jug with pouring spout. The pressure compensation opening sealed by the plug can also be present in another region of the outer wall of the vessel. Though the vessel is preferably made from glass, it can also be made from another material. Correspondingly, other materials for the plug and for the adhesive are also conceivable. Instead of just a single gas passage channel, a plurality of such channels can also be formed.

The invention claimed is:

1. A double-walled vessel comprising:
   an outer vessel body;
   an inner vessel body arranged in the outer vessel body in such a way that a gas-filled interspace is formed between the inner and the outer vessel body, a pressure compensation opening being present in a limit wall of at least one of the vessel bodies; and
   a plug sealing the pressure compensation opening, the plug being made of an elastic and hydrophobic material, the plug having at least one gas passage channel extending completely through the plug, the gas passage channel having dimensions that allow a passage of air while being sufficiently small to prevent water from penetrating into the interspace, due to a negative capillarity caused by the hydrophobic properties of the material of the plug.

2. The double-walled vessel as claimed in claim 1, wherein the plug is made from a silicone-based plastic.

3. The double-walled vessel as claimed in claim 2, wherein the plug is fastened to the vessel body with an acetoxy-silicone-based adhesive.

4. The double-walled vessel as claimed in claim 1, wherein the gas passage channel is of self-sealing configuration.

5. The double-walled vessel as claimed in claim 1, wherein the plug comprises a main portion, which extends into the pressure compensation opening and through which the gas passage channel extends, and a fastening flange, which laterally surrounds the main portion and which, at least in some areas, rests flat on the wall of the vessel body.

6. The double-walled vessel as claimed in claim 5, wherein the main portion has a maximum outer diameter which is smaller than a minimum inner diameter of the pressure compensation opening, so that a lateral gap is present between the main portion and a wall region of the vessel body which delimits the pressure compensation opening.

7. The double-walled vessel as claimed in claim 1, wherein the plug has a circumferential annular groove, into which a wall region of the vessel body, which delimits the pressure compensation opening, projects.

8. The double-walled vessel as claimed in claim 5, wherein the fastening flange is glued to the wall of the vessel body.

9. The double-walled vessel of claim 1, wherein the gas passage channel has been formed by piercing of the plug by means of a needle.

10. A method for producing a double-walled vessel, comprising:
    providing an outer vessel body and an inner vessel body, a pressure compensation opening being present in a limit wall of at least one of the vessel bodies;
    arranging the inner vessel body in the outer vessel body and connecting the vessel bodies such that a gas-filled interspace is formed between the vessel bodies, a passage of gas through the pressure compensation opening being enabled during the connection;
    sealing the pressure compensation opening with a plug made of a hydrophobic material, said plug having at least one gas passage channel extending completely through the plug and being dimensioned to cause a negative capillary effect that prevents water from penetrating into the interspace while allowing a passage of air.

11. The method as claimed in claim 10, wherein the plug is produced from an elastic plastics material, by the plastics material or a precursor thereof being poured in liquid form into a mold and then hardened, and wherein the gas passage channel is formed only after the plastics material has at least partially hardened.

12. The method as claimed in claim 10, wherein the gas passage channel is formed by piercing of the plug by means of a needle.

13. A double-walled vessel comprising:
    an outer vessel body;
    an inner vessel body arranged in the outer vessel body in such a way that a gas-filled interspace is formed between the inner and the outer vessel body, a pressure compensation opening being present in a limit wall of at least one of the vessel bodies; and
    a plug sealing the pressure compensation opening, the plug being made of an elastic and hydrophobic material, the plug defining at least one gas passage channel extending completely through the plug, the gas passage channel having a self-sealing configuration so that the gas passage channel is closed in the absence of a pressure difference between the interspace and an exterior of the double-walled vessel, and is open when a pressure difference is applied between the interspace and the exterior, the gas passage channel being configured to widen under the influence of the pressure difference to only such an extent that negative capillarity prevents water from penetrating into the interspace while allowing a passage of air.

14. The double-walled vessel of claim 13, wherein the gas passage channel has been formed by piercing of the plug by means of a needle.

* * * * *